United States Patent
Estenne

(10) Patent No.: US 11,590,809 B2
(45) Date of Patent: Feb. 28, 2023

(54) BEAD FOR A TIRE FOR A CIVIL-ENGINEERING HEAVY VEHICLE

(71) Applicant: COMPAGNIE GENERALE DES ETABLISSEMENTS MICHELIN, Clermont-Ferrand (FR)

(72) Inventor: Vincent Estenne, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/262,651

(22) PCT Filed: Jul. 17, 2019

(86) PCT No.: PCT/FR2019/051790
§ 371 (c)(1),
(2) Date: Jan. 22, 2021

(87) PCT Pub. No.: WO2020/021183
PCT Pub. Date: Jan. 30, 2020

(65) Prior Publication Data
US 2021/0309052 A1   Oct. 7, 2021

(30) Foreign Application Priority Data

Jul. 24, 2018   (FR) ...................................... 1856845

(51) Int. Cl.
*B60C 15/06* (2006.01)

(52) U.S. Cl.
CPC .... *B60C 15/0628* (2013.01); *B60C 2015/065* (2013.01); *B60C 2015/0621* (2013.01); *B60C 2015/0682* (2013.01); *B60C 2200/065* (2013.01)

(58) Field of Classification Search
CPC . B60C 15/0628; B60C 15/06; B60C 15/0607; B60C 15/02; B60C 15/024;
(Continued)

(56) References Cited

U.S. PATENT DOCUMENTS 3,406,733 A   10/1968   Boileau
6,135,182 A * 10/2000   Nagai ..................... B60C 15/06
                                                            152/458
(Continued)

FOREIGN PATENT DOCUMENTS

EP   1 911 607   4/2008
EP   2 910 391   8/2015
(Continued)

*Primary Examiner* — Cedrick S Williams
(74) *Attorney, Agent, or Firm* — Cozen O'Connor

(57) ABSTRACT

Improving the endurance of the beads (1) of a radial tire for a civil-engineering heavy vehicle by proposing a solution which blocks the propagation of the cracks initiated in the coating elastomer of the bead reinforcing layer (5), by inserting a cushion rubber (6) interposed between the coating elastomer of the carcass layer turn-up (312) and the coating elastomer of the bead reinforcing layer (5). The elastic modulus in extension of the cushion rubber (6) measured at 100% deformation must be less than the elastic modulus of the coating compound of the carcass layer. Still according to a disclosed embodiment, the thickness of the cushion rubber (6) is at least equal to the thickness of the bead reinforcing layer (5).

11 Claims, 3 Drawing Sheets

(58) Field of Classification Search
CPC .... B60C 2015/0617; B60C 2015/0245; B60C 2015/0621; B60C 2200/06; B60C 2200/065; B60C 2200/08
See application file for complete search history.

(56) References Cited

U.S. PATENT DOCUMENTS

| | | |
|---|---|---|
| 2010/0089513 A1 | 4/2010 | Sasaki |
| 2011/0178256 A1* | 7/2011 | Hamann ............... C08F 236/10 526/79 |
| 2015/0283865 A1 | 10/2015 | Ueda |
| 2018/0126801 A1 | 5/2018 | Sato |

FOREIGN PATENT DOCUMENTS

| | | | | |
|---|---|---|---|---|
| EP | 3 299 186 | | 3/2018 | |
| JP | 11-1107 | * | 6/1999 | ............. B60C 15/06 |
| JP | 2001206027 A | * | 7/2001 | |
| JP | 2011246086 A | * | 12/2011 | |

* cited by examiner

BEAD FOR A TIRE FOR A CIVIL-ENGINEERING HEAVY VEHICLE

RELATED APPLICATIONS

This is a U.S. National Phase Application under 35 USC 371 of International Application PCT/FR2019/051790 filed on Jul. 17, 2019.

This application claims the priority of French application no. 18/56845 filed Jul. 24, 2018, the entire content of which is hereby incorporated by reference.

FIELD OF THE INVENTION

The present invention relates to a radial tire intended to be fitted to a civil-engineering heavy vehicle.

BACKGROUND OF THE INVENTION

Although not restricted to this type of application, the invention will be more particularly described with reference to a radial tire intended to be mounted on a dumper, a vehicle for transporting materials extracted from quarries or open cast mines. The nominal diameter of the rim of such a tire, within the meaning of the European Tire and Rim Technical Organisation (ETRTO) standard, is a minimum of 25 inches.

The following definitions apply in what follows:
"Meridian plane": a plane containing the axis of rotation of the tire.
"Equatorial plane": the plane passing through the middle of the tire tread surface and perpendicular to the axis of rotation of the tire.
"Radial direction": a direction perpendicular to the axis of rotation of the tire.
"Axial direction": a direction parallel to the axis of rotation of the tire.
"Circumferential direction": a direction perpendicular to a meridian plane.
"Radial distance": a distance measured perpendicular to the axis of rotation of the tire and from the axis of rotation of the tire.
"Axial distance": a distance measured parallel to the axis of rotation of the tire and from the equatorial plane.
"Radially": in a radial direction.
"Axially": in an axial direction.
"Radially on the inside, or respectively radially on the outside": which is situated at a smaller or greater radial distance, respectively.
"Axially on the inside, or respectively axially on the outside": which is situated at a smaller or greater axial distance, respectively.

A tire comprises two beads which provide the mechanical connection between the tire and the rim on which it is mounted, the beads being joined respectively by two sidewalls to a tread intended to come into contact with the ground via a tread surface.

A radial tire more particularly comprises a reinforcement comprising a crown reinforcement radially on the inside of the tread and a carcass reinforcement radially on the inside of the crown reinforcement.

The carcass reinforcement of a radial tire for a civil-engineering heavy vehicle comprises at least one carcass layer made up of metallic reinforcing elements coated with an elastomeric coating material, most often a single carcass layer. In what follows, the carcass reinforcement is assumed to be made up of a single carcass layer. The metallic reinforcing elements of a carcass layer are substantially parallel to one another and form, with the circumferential direction, an angle of between 85° and 95°. The carcass layer comprises a main part connecting the two beads to one another and wrapping, in each bead, around a bead wire core. The bead wire core comprises a circumferential reinforcing element, usually made of metal, surrounded by at least one material, which, and this list is not exhaustive, may be made of polymer or textile. The wrapping of the carcass layer around the bead wire core goes from the inside to the outside of the tire to form a carcass layer turn-up, comprising a free end. The carcass layer turn-up, in each bead, allows the carcass layer to be anchored to the bead wire core of the bead.

Each bead comprises a filler element which extends the bead wire core radially outwards. The filler element has, in every meridian plane, a substantially triangular cross section and is made up of at least one elastomeric filler material. The filler element may be made up of a stack in the radial direction of at least two elastomeric filler materials which are in contact along a contact surface that intersects any meridian plane along a meridian line. The filler element axially separates the main carcass layer part and the carcass layer turn-up.

Each bead also comprises a protection element radially inwardly extending the sidewall and axially on the outside of the carcass layer turn-up. The protection element is also at least partially in contact via its axially outer face with the flange of the rim. The protection element is made up of at least one elastomeric protection material.

Each bead finally comprises a filling element axially on the inside of the sidewall and of the protection element and axially on the outside of the carcass layer turn-up. The filling element is made up of at least one elastomeric filling material.

To improve the endurance of the bead, it is usual practice to add a reinforcing layer which is at least partially in contact with the carcass layer turn-up. Said reinforcing layer is made up of reinforcers coated in an elastomeric compound and forms, with the radial direction (ZZ'), an angle at most equal to 45°.

An elastomeric material, after curing, is mechanically characterized by tensile stress-deformation characteristics which are determined by tensile testing. This tensile testing is carried out by a person skilled in the art, on a test specimen, according to a known method, for example in accordance with international standard ISO 37, and under standard temperature (23+ or −2° C.) and moisture (50+ or −5% relative humidity) conditions defined by international standard ISO 471. The elastic modulus at 100% elongation of an elastomeric compound, expressed in megapascals (MPa), is the name given to the tensile stress measured for a 100% elongation of the test specimen.

An elastomeric material, after curing, is also mechanically characterized by its hardness. The hardness is notably defined by the Shore A hardness determined in accordance with standard ASTM D 2240-86.

When the vehicle is being driven along, the tire, mounted on its rim, inflated and compressed under the load of the vehicle, is subjected to bending cycles, particularly in its beads and its sidewalls.

The bending cycles cause shear and compression stresses and deformations, in the elastomeric coating and filling materials, on the axially outer face of the carcass layer turn-up on account of the bending of the bead on the rim flange.

This mechanical loading on the bead is the cause of initiation of cracks in the coating elastomer of the reinforcing layer of the carcass reinforcement opposite the heel of the bead. These cracks propagate towards the protection element which is in contact with the rim, causing damage to the tire.

SUMMARY OF THE INVENTION

The inventors set themselves the objective of improving the endurance of the beads of a radial tire for a civil-engineering heavy vehicle by blocking the propagation of the cracks initiated in the coating elastomer of the reinforcing layer towards the protection element in contact with the rim.

This objective was achieved, according to an embodiment of the invention, by a tire for a heavy vehicle, comprising:

two beads each intended to come into contact with a rim by way of a contact face;

contact face, when the tire is mounted and inflated on its rim, comprising a first axial portion, substantially parallel to an axial direction parallel to the axis of rotation of the tire, connected by a second circular portion, having a centre O, to a third radial portion, parallel to a radial direction;

said tire comprising a carcass reinforcement connecting the two beads to one another and comprising at least one carcass layer made up of reinforcers coated in an elastomeric coating compound M1 having an elastic modulus in extension at 100% elongation E1;

said carcass layer comprising a main part wrapping in each bead, from the inside to the outside of the tire, around a bead wire core inscribed in a circle having a centre G and a radius R, to form a turn-up;

a bead reinforcing layer having a thickness Er and made up of reinforcers coated in an elastomeric coating compound M2 having an elastic modulus in extension at 100% elongation E2 and forming, with the radial direction, an angle A at most equal to 45°;

said bead reinforcing layer being at least partially in contact with the carcass reinforcement and extending on the outside of the carcass reinforcement from a first end radially on the outside of an axial straight line passing through the centre G of the circle circumscribed on the bead wire core as far as a second end axially on the inside of a radial straight line passing through the centre G of the bead wire core;

each bead comprising a cushion rubber made up of an elastomeric compound M3 having an elastic modulus in extension at 100% elongation E3, said cushion rubber being interposed between the carcass reinforcement and the bead reinforcing layer and extending over an angular sector defined by the angle formed by the straight lines passing respectively through the centre G of the bead wire core and the radially outer end of the cushion rubber and through the centre of the bead wire core and the radially inner end of the cushion rubber;

said cushion rubber having a maximum thickness Emax, at least equal to the thickness Er of the bead reinforcing layer, measured on the straight line passing through the centre O of the second circular portion of the contact face and perpendicular to the carcass reinforcement;

the elastic modulus in extension at 100% elongation E3 of the elastomeric compound M3 making up the cushion rubber being less that the elastic modulus in extension at 100% elongation E1 of the elastomeric coating compound M1 of the carcass layer.

According to an embodiment of the invention, it is advantageous to have a cushion rubber interposed between the reinforcing layer and the carcass layer turn-up. The bead is subjected to extension-compression cycles during the use of the inflated tire mounted on its rim, compressed by the load of the vehicle and rotating about its axis. The addition of the cushion rubber moves the coating elastomer of the reinforcing layer away from the region of greatest shear.

According to an embodiment of the invention, the cushion rubber has a maximum thickness Emax, at most equal to the thickness Er of the bead reinforcing layer, measured on the straight line passing through the centre O of the second circular portion of the contact face with the rim and perpendicular to the carcass reinforcement.

In the absence of cushion rubber, the crack is initiated in the coating rubber of the reinforcing layer. The inventors established that optimal operation of the invention requires the cushion rubber to have a thickness at least equal to that of the reinforcing layer, which is the sum of the thicknesses of the coating rubber, on the back of the reinforcers, and of the diameter of the reinforcers making up the reinforcing layer.

Still according to an embodiment of the invention, the elastic modulus in extension at 100% elongation E3 of the elastomeric compound M3 making up the cushion rubber is less that the elastic modulus in extension at 100% elongation E1 of the elastomeric coating compound M1 of the carcass layer.

The cushion rubber is in contact via its axially inner surface with the elastomeric coating compound of the carcass layer. The axially outer surface of the cushion rubber is in contact with the elastomeric coating compound of the reinforcing layer. The objective is that of concentrating and containing the maximum deformations in the cushion rubber in this region. A sufficient condition for operating the invention is to have a softer cushion rubber, that is to say with an elastic modulus in extension at 100% deformation that is weaker than that of the elastomeric coating compound of the carcass layer.

Advantageously, the angular sector of the cushion rubber is greater than or equal to 45° and less than or equal to 90°.

The angular positioning of the cushion rubber must be defined precisely to guarantee the efficiency of the cushion rubber. It is defined in relative position with respect to the bead wire core insofar as the diameter of the bead wire core is the determining parameter for the size of the bead. Specifically, for a tire having a seat diameter of 25 inches, the diameter of the bead wire core is approximately 37 mm, whereas, for a tire having a seat diameter of 63 inches, the diameter of the bead wire core is 84 mm.

Over a tire dimension with a seat diameter of 25 inches, the angular sector of the cushion rubber is equal to 60°, whereas, over a dimension with a seat diameter of 63 inches, the angular sector can reach 80°.

The inventors established that the range in variation of the angular sector of the cushion rubber varies between 45° and 90° for correct operation of the invention.

Advantageously still, the radially inner end of the cushion rubber is positioned, with respect to the radial straight line passing through the centre G of the bead wire, at an axial distance greater than or equal to 10 mm.

Thus defined, the cushion rubber in its radially inner portion is not found in the region of clamping of the bead wire onto the rim, and therefore does not affect the contact pressures of the mounting of the bead on the rim.

In one preferred embodiment of the invention, the elastic modulus in extension at 100% elongation E3 of the elastomeric compound M3 making up the cushion rubber is at most equal to 60% of the elastic modulus in extension at 100% elongation E1 of the elastomeric coating compound M1 of the carcass layer.

A significant difference in rigidity between the elastomeric compound of the cushion rubber and the elastomeric coating compound of the carcass layer is sought for correct operation of the invention. An example of rigidity values is 1.6 MPa for the elastic modulus in extension E3, and 2.6 MPa for the elastic modulus in extension E1.

In another preferred embodiment of the invention, the elastic modulus in extension at 100% elongation E3 of the elastomeric compound M3 making up the cushion rubber is less than or equal to the elastic modulus in extension at 100% elongation E2 of the elastomeric coating compound M2 of the bead reinforcing layer.

In the crack initiation region, the compounds in question are the elastomeric coating compounds of the carcass layer, of the bead reinforcing layer, and of the cushion rubber. The inventors established the relationship that the elastic modulus in extension at 100% deformation of the cushion rubber must be less than both the elastic moduli in extension at 100% deformation of the elastomeric coating compound of the carcass layer and of the elastomeric coating compound of the bead reinforcing layer.

It is advantageous for the elastic modulus in extension at 100% elongation E3 of the elastomeric compound M3 making up the cushion layer to be equal to 1.6 MPa.

It is also advantageous for the elastic modulus in extension at 100% elongation E1 of the elastomeric coating compound M1 of the carcass layer to be equal to 2.6 MPa.

The elastomeric coating compound of the carcass layer must have an elastic modulus in extension at 100% deformation that is much greater than that of the cushion rubber. A pair of values of 1.6 MPa for the cushion rubber and of 2.6 MPa for the carcass layer is sufficient to block the propagation of the cracks initiated in the elastomeric coating compound of the reinforcing layer.

It is also advantageous for the reinforcers of the reinforcing layer of the bead to form, with the radial direction of the tire, an angle at least equal to 22° and at most equal to 28°.

Generally, the angle of the reinforcers of the reinforcing layer of the bead is equal to 45°. However, the inventors observed that by containing the angle to a value of between 20° and 28°, the circumferential rigidities of the bead increase, thus improving the operation of the invention.

In one embodiment of the invention, the reinforcers of the bead reinforcing layer form, with the radial direction of the tire, a variable angle at least equal to 25° on one part of the layer and at most equal to 45° on the remaining part.

According to the invention, the thickness Er of the bead reinforcing layer is less than or equal to 2.5 mm.

BRIEF DESCRIPTION OF THE DRAWINGS

In order to limit the temperature in the bead, the inventors established that the maximum thickness of the bead reinforcing layer should remain less than 2.5 mm. Moreover, the insertion of the cushion rubber must not excessively modify the meridian profile of the carcass reinforcement. Thus, by restricting the thickness of the reinforcing layer, it is then possible for a cushion rubber with a maximum thickness of up to 8 mm to be inserted on a large tire dimension such as 59/60R63, whereas the maximum thickness of the cushion rubber is 6 mm on a small dimension such as 18.00 R25.

DETAILED DESCRIPTION OF THE EMBODIMENTS

Figure 1:
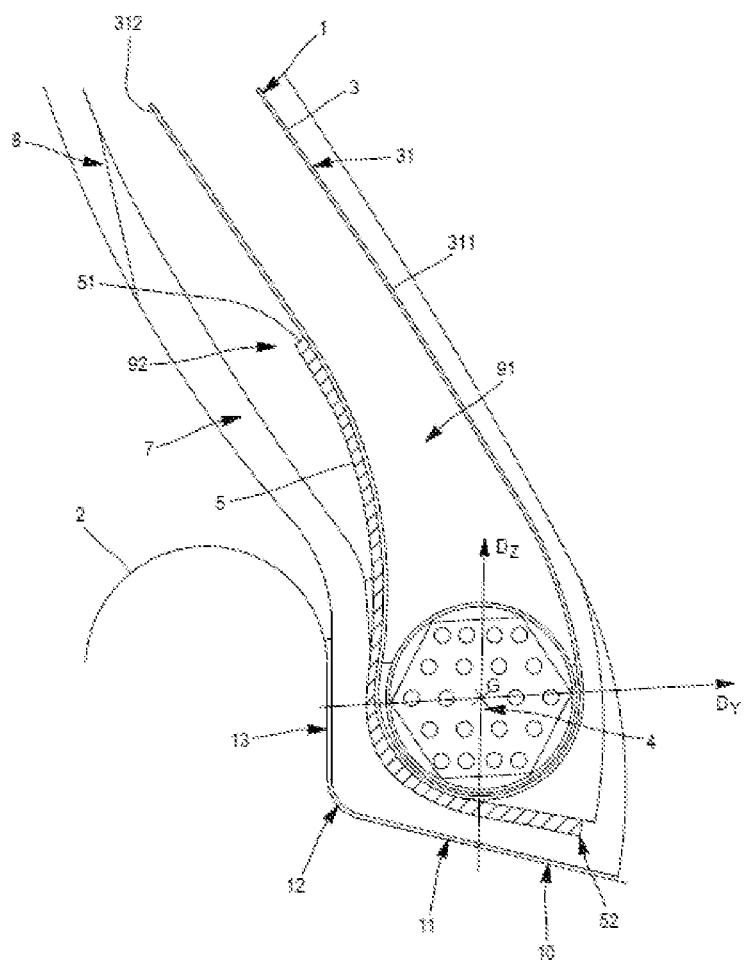
Figure 2:
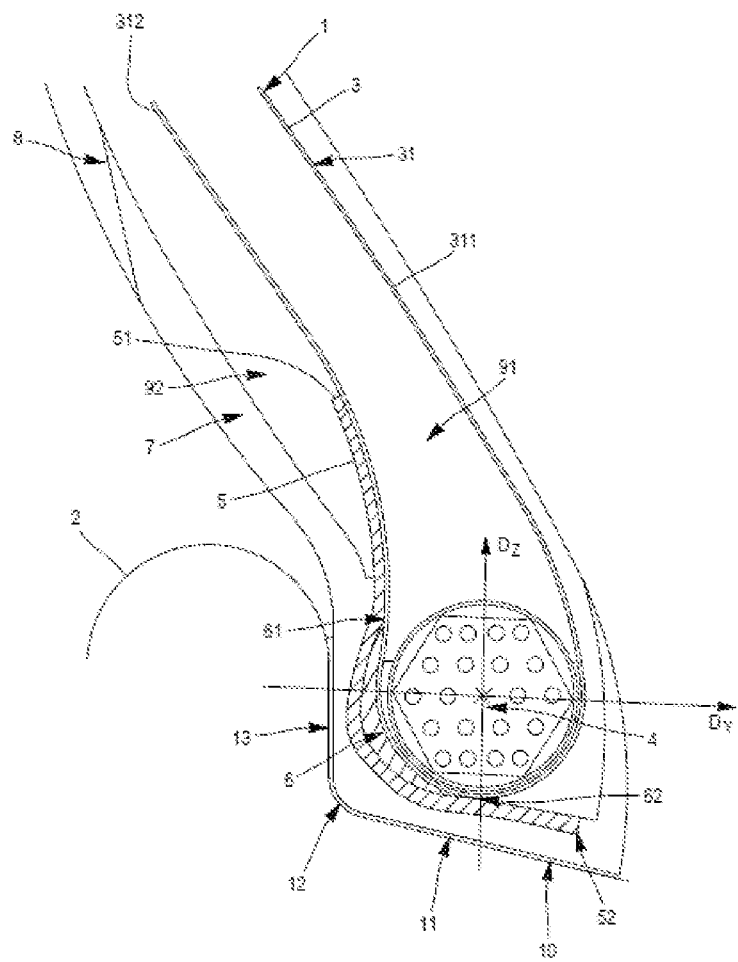
Figure 3:
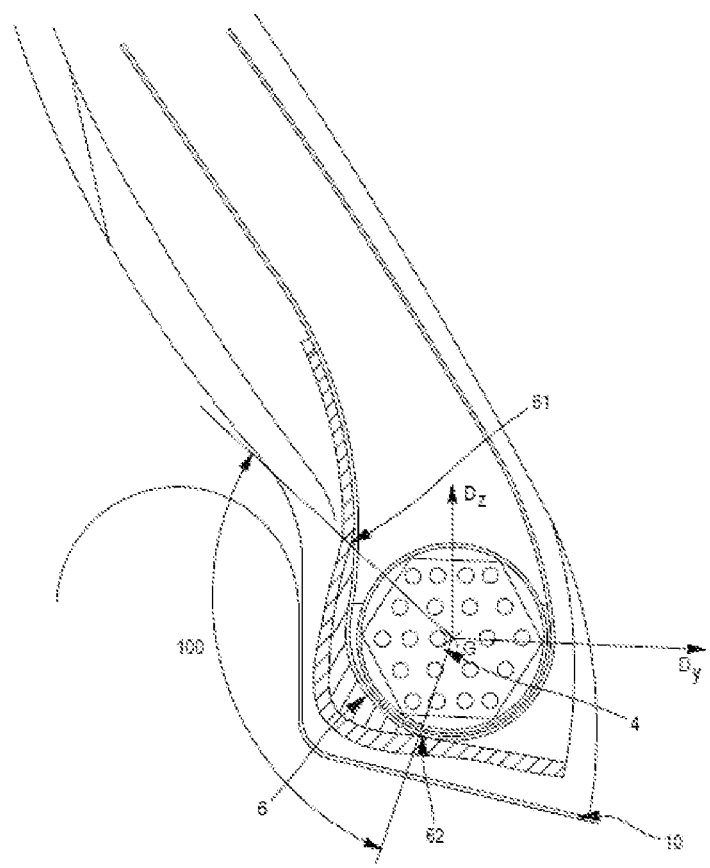

The features of the invention will be better understood with the aid of the description of the attached FIGS. 1, 2 and 3:

FIG. 1 represents a sectional view in a meridian plane of the bead of a tire for a civil-engineering heavy vehicle of the prior art.

FIG. 2 represents a sectional view in a meridian plane of the bead of a tire for a civil-engineering heavy vehicle, according to the invention.

FIG. 3 represents a sectional view in a meridian plane of the bead of a tire for a civil-engineering heavy vehicle, according to the invention, defining the angular positioning of the cushion rubber.

In order to make them easier to understand, FIGS. 1, 2 and 3 are not drawn to scale.

FIG. 1 shows a bead 1 of a tire for a civil-engineering heavy vehicle of the prior art, mounted on a rim 2, comprising:

- a carcass reinforcement 3 comprising a single carcass layer 31 made up of metallic reinforcing elements coated with an elastomeric coating material, with a main carcass layer part 311 wrapping, from the inside towards the outside of the tire, around a bead wire core 4, to form a carcass layer turn-up 312;
- a filler element 91 radially outwardly extending the bead wire core 4, having, in every meridian plane, a substantially triangular cross section and being made up of an elastomeric filler material;
- a protection element 7 axially inwardly extending a sidewall 8 and made up of an elastomeric protection material;
- a filling element 92 axially on the inside of the protection element 7 and of the sidewall 8 and axially on the outside of the carcass reinforcement turn-up 312 and made up of an elastomeric filling material;
- a bead reinforcing layer 5 extending between a radially outer end 51 and a radially inner end 52, axially on the outside of and in contact with the carcass layer turn-up 312.

FIG. 2 shows a bead of a tire for a civil-engineering heavy vehicle, according to the invention, comprising:

- a carcass reinforcement 3 comprising a single carcass layer 31 made up of metallic reinforcing elements coated with an elastomeric coating material, with a main carcass layer part 311 wrapping, from the inside towards the outside of the tire, around a bead wire core 4, to form a carcass layer turn-up 312;
- a filler element 91 radially outwardly extending the bead wire core 4, having, in every meridian plane, a substantially rectangular cross section and being made up of an elastomeric filler material;
- a protection element 7 axially inwardly extending a sidewall 8 and made up of an elastomeric protection material;
- a filling element 92 axially on the inside of the protection element 7 and of the sidewall 8 and axially on the outside of the carcass reinforcement turn-up 312 and made up of an elastomeric filling material;
- a bead reinforcing layer 5 extending between a radially outer end 51 and a radially inner end 52, axially on the outside of and in contact with the carcass layer turn-up 312;
- a cushion rubber 6 in contact, via an axially inner face, with the elastomeric coating material of the axially outer face of the carcass layer turn-up 312 and, via an axially outer face, with the elastomeric coating material of the bead reinforcing layer 5.

FIG. 3 shows a zoom on the bead to demonstrate the positioning of the cushion rubber:
- the respective radially outer and radially inner ends 61 and 62 which delimit the cushion rubber 6;
- the angular sector 100 of the cushion rubber 6, defined by the angle formed by the straight lines passing respectively through the centre G of the bead wire core 4 and the radially outer end 61 of the cushion rubber 6 and through the centre G of the bead wire core 4 and the radially inner end 62 of the cushion rubber 6;

the bead wire core 4 of centre G, of hexagonal shape.

The invention was more particularly studied in the case of a tire for a dumper-type heavy vehicle of dimension 59/80R63, designed to bear a load of 104 tonnes at a use pressure of 6.8 bar.

The cushion rubber is placed on the axially outer face of the carcass layer turn-up with a curvilinear length of 60 mm between a radially outer end 61 and a radially inner end 62. Its angular sector measured with respect to the centre G of the bead wire between the segments joining this centre G and, on the one hand, the radially outer end of the cushion rubber and, on the other hand, its radially inner end is 80°. In this embodiment of the invention, the maximum thickness of the cushion rubber is equal to 8 mm, measured on the axis orthogonal to the carcass reinforcement that passes through the centre of the fillet 12 connecting the axial part 13 and radial part 11 of the rim flange.

The carcass reinforcement is made up of a carcass layer formed by metallic reinforcers coated in an elastomeric compound. The metallic reinforcers are cords made up of 189 threads of 23 hundredths of a millimetre in diameter each.

The elastomeric coating compound of the carcass layer is obtained according to the following composition, expressed in parts per hundred elastomer (phr):

TABLE NO. 1

| Composition | Elastomer NR (Natural Rubber) | Carbon black N326 | Antioxidant | ZnO | Stearic acid | Sulfur | DCBS | OPF Epoxy resin | Cobalt salt | CTP |
|---|---|---|---|---|---|---|---|---|---|---|
| Elastomeric coating compound of the carcass | 100 | 47 | 1.5 | 7.5 | 0.9 | 5.63 | 0.8 | 0.5 | 1.5 | 0.15 |

With the above composition, the elastomeric coating compound of the carcass layer has an elastic modulus in extension measured at 100% deformation with a value of 2.6 MPa, and at 10% deformation the elastic modulus in extension has a value of 5.2 MPa.

In a simplified embodiment of the invention, the elastomeric coating compound of the reinforcing layer is made up of the same elastomeric coating compound as that of the carcass layer.

The cushion rubber has an elastic modulus in extension measured at 100% deformation with a value of 1.6 MPa, and at 10% deformation the elastic modulus in extension has a value of 3.2 MPa.

The cushion rubber is significantly softer than the elastomeric coating compound of the carcass layer: at 100% deformation, the elastic modulus in extension of the cushion rubber represents 60% of that of the reinforcing layer. This offset in the elastic modulus in extension is found more or less for all the levels of deformation.

The 59/80R63 tire was designed according to the invention, as depicted in FIG. 2.

Simulations of finite-element calculations were carried out respectively on a reference tire, as depicted in FIG. 1, and on a tire according to the invention, as depicted in FIG. 2.

The inventors established that the deformation energy density is the relevant physical quantity for analysing the propagation of the cracks. They considered the peak-to-peak evolution of the deformation energy density over one wheel revolution, calculated in the elastomeric coating compounds of the carcass and reinforcing layers of the bead for the reference tire and the tire of the invention. For the tire of the invention, the deformation energy density was also calculated in the cushion rubber.

The inventors also performed parametric sensitivity calculations in relation to the angle formed between the reinforcers of the reinforcing layer of the bead and the direction ZZ' for the purpose of determining the optimal angle for maximizing the circumferential rigidities of the bead.

The results of the calculations are compared between the reference tire and the tire of the invention:

TABLE NO. 2

| | Deformation energy density calculated in the cracking region | | |
|---|---|---|---|
| Region | Coating compound of the reinforcing layer | Coating compound of the carcass layer | Degree of participation of the cushion rubber |
| Reference tire | 100 | 100 | NA |
| Tire of the invention provided with a reinforcing layer with reinforcers at 25° | 110 | 109 | 82 |

TABLE NO. 2-continued

| | Deformation energy density calculated in the cracking region | | |
|---|---|---|---|
| Region | Coating compound of the reinforcing layer | Coating compound of the carcass layer | Degree of participation of the cushion rubber |
| Tire of the invention provided with a reinforcing layer with reinforcers at variable 25°/45° angles | 77 | 121 | 66 |

On the reference tire (base 100), the crack is initiated in the elastomeric coating compound of the reinforcing layer and then propagates in the direction of the protection rubber in contact with the rim at the seat.

On the tire of the invention, in the fourth line of Table No. 2, the peak-to-peak variation in the deformation energy density is reduced by approximately 10% in the coating compound of the reinforcing layer. The gain is approximately 9% in the coating elastomer of the carcass layer. The cushion rubber participates to the amount of 82% in this improvement, which is sufficient to prevent the propagation of the crack.

In one embodiment of the invention with a reinforcing layer provided with reinforcers at variable angles, in this instance 25° and 45°, the gain is clearly perceptible in the coating elastomer of the carcass layer (121%), but the peak-to-peak variations in the deformation energy density continue to be high in the coating elastomer of the reinforcing layer. Here, too, the invention operates, with the crack not propagating.

The results of optimizing the angle of the reinforcing layer converged towards an angle value of 25°.

The invention should not be interpreted as being restricted to the example illustrated in FIG. 2, but may be extended to other variant embodiments, such as, for example, and in a non-exhaustive manner, relating to the number of elastomeric transition materials comprised between the elastomeric coating material and the elastomeric filling material.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy vehicle, comprising:
   two beads each intended to come into contact with a rim by way of a contact face,
   said contact face comprising a first axial portion substantially parallel to an axial direction parallel to the axis of rotation of the tire, connected by a second circular portion, having a centre, to a third radial portion, parallel to a radial direction,
   said tire comprising a carcass reinforcement connecting the two beads to one another and comprising at least one carcass layer made up of reinforcers coated in an elastomeric coating compound M1 having an elastic modulus in extension at 100% elongation E1,
   said carcass layer comprising a main part wrapping in each bead, from the inside to the outside of the tire, around a bead wire core inscribed in a circle having a centre G and a radius R, to form a turn-up,
   a bead reinforcing layer having a thickness and made up of reinforcers coated in an elastomeric coating compound M2 having an elastic modulus in extension at 100% elongation E2 and forming, with the radial direction, an angle A at most equal to 45°, wherein the bead reinforcing layer comprises a first leg extending along the first axial portion of the contact face and a second leg extending radially and a curved portion between the first and second legs, wherein an axial inner end of the first leg is radially inside the bead;
   a radially outer portion of the second leg of said bead reinforcing layer being at least partially in contact with the carcass reinforcement and extending on the outside of the carcass reinforcement from a first end radially on the outside of an axial straight line (DY) passing through the centre G of the circle circumscribed on the bead wire core as far as a second end axially on the inside of a radial straight line (DZ) passing through the centre G of the bead wire core,
   wherein each bead comprises a cushion rubber arranged directly between an axially inner side of the bead reinforcing layer and axially outer side of the carcass layer turn-up in an area of the bead and is made up of an elastomeric compound M3 having an elastic modulus in extension at 100% elongation E3, said cushion rubber being interposed between the carcass reinforcement and the bead reinforcing layer and extending over an angular sector defined by the angle formed by the straight lines passing respectively through the centre G of the bead wire core and the radially outer end of the cushion rubber and through the centre G of the bead wire core and the radially inner end of the cushion rubber;
   wherein said cushion rubber has a maximum thickness Emax, at least equal to the thickness Er of the bead reinforcing layer, measured on the straight line passing through the centre of the second circular portion of the contact face and perpendicular to the carcass reinforcement,
   wherein the angular sector of the cushion rubber is greater than or equal to 45° and less than or equal to 90°, and
   in that the elastic modulus at 100% elongation E3 of the elastomeric compound M3 making up the cushion rubber is less than the elastic modulus at 100% elongation E1 of the elastomeric coating compound M1 of the carcass layer.

2. The tire according to claim 1, wherein the radially inner end of the cushion rubber is positioned, with respect to the radial straight line passing through the centre G of the bead wire, at an axial distance greater than or equal to 10 mm.

3. The tire according to claim 1, wherein the elastic modulus in extension at 100% elongation E3 of the elastomeric compound M3 making up the cushion rubber is at most equal to 60% of the elastic modulus at 100% elongation E1 of the elastomeric coating compound M1 of the carcass layer.

4. The tire according to claim 1, wherein the elastic modulus in extension at 100% elongation E3 of the elastomeric compound M3 making up the cushion rubber is less than or equal to the elastic modulus in extension at 100% elongation E2 of the elastomeric coating compound M2 of the bead reinforcing layer.

5. The tire according to claim 1, wherein the elastic modulus in extension at 100% elongation E3 of the elastomeric compound M3 making up the cushion rubber is equal to 1.6 MPa.

6. The tire according to claim 1, wherein the elastic modulus in extension at 100% elongation E1 of the elastomeric coating compound M1 of the carcass layer is equal to 2.6 MPa.

7. The tire according to claim 1, wherein the reinforcers of the bead reinforcing layer form, with the radial direction of the tire, an angle at least equal to 22° and at most equal to 28°.

8. The tire according to claim 1, wherein the reinforcers of the bead reinforcing layer form, with the radial direction of the tire, a variable angle at least equal to 25° on one part of the layer and at most equal to 45° on the remaining part.

9. The tire according to claim 1, wherein the thickness Er of the bead reinforcing layer is less than or equal to 2.5 mm.

10. The tire according to claim 1, wherein the cushion rubber is arranged radially outside the bead wire and extends radially from a radially inner portion of the bead wire core inscribed in the circle to at least the axial straight line (DY) passing through the centre G of the circle circumscribed on the bead wire core.

11. The tire according to claim 1, wherein the tire for a heavy vehicle configured to bear a load of 104 tonnes at a use pressure of 6.8 bar.

* * * * *